(12) United States Patent
Lee

(10) Patent No.: US 9,021,513 B2
(45) Date of Patent: Apr. 28, 2015

(54) APPARATUS FOR PROTECTING OPTICAL DISC DRIVES

(71) Applicant: Toshiba Samsung Storage Technology Korea Corporation, Suwon-si (KR)

(72) Inventor: Young-bin Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/919,398

(22) Filed: Jun. 17, 2013

(65) Prior Publication Data

US 2013/0339988 A1 Dec. 19, 2013

(30) Foreign Application Priority Data

Jun. 18, 2012 (KR) ........................ 10-2012-0065244

(51) Int. Cl.
*G11B 7/08* (2006.01)
*G11B 7/12* (2012.01)
*G11B 7/135* (2012.01)
*G11B 7/00* (2006.01)
*G11B 7/09* (2006.01)

(52) U.S. Cl.
CPC ............ *G11B 7/1201* (2013.01); *G11B 7/0932* (2013.01); *G11B 7/0933* (2013.01)

(58) Field of Classification Search
USPC ......... 369/44.14, 44.15, 44.22; 720/681, 683, 720/685
See application file for complete search history.

(56) References Cited

U.S. PATENT DOCUMENTS

| 8,520,479 | B2 * | 8/2013 | Lee et al. | .................. 369/44.14 |
| 2012/0281517 | A1 * | 11/2012 | Lee et al. | ................. 369/112.23 |
| 2013/0339987 | A1 * | 12/2013 | Yun et al. | ...................... 720/681 |

FOREIGN PATENT DOCUMENTS

| JP | 2002-163832 | 6/2002 |
| JP | 2004-152421 | 5/2004 |
| KR | 2008-0030930 | 4/2008 |
| KR | 2010-0064842 | 6/2010 |

* cited by examiner

*Primary Examiner* — Will J Klimowicz
(74) *Attorney, Agent, or Firm* — NSIP Law

(57) ABSTRACT

Provided are apparatuses for grounding the objective lens driving unit of an optical pickup device. An optical pickup device includes an objective lens driving unit and a base that supports the objective lens driving unit, and wherein the objective lens driving unit includes a moving structure including an objective lens and a plurality of drive coils; a static structure comprising magnets corresponding to the plurality of drive coils, a yoke that supports the magnets, and a wire holder that has a plurality of wiring layers including a ground wiring layer; a plurality of suspension wires that connect the plurality of drive coils to the plurality of wiring layers; a supporting portion connected to the yoke and fixed to the wire holder; a projection extending from the supporting portion and disposed adjacent to the ground wiring layer; and conductive bonding material connects the ground wiring layer with the projection.

11 Claims, 6 Drawing Sheets

APPARATUS FOR PROTECTING OPTICAL DISC DRIVES

CROSS-REFERENCE TO RELATED PATENT APPLICATION

This application claims the benefit under 35 U.S.C. §119(a) of Korean Patent Application No. 10-2012-0065244, filed on Jun. 18, 2012, in the Korean Intellectual Property Office, the entire disclosure of which is incorporated herein by reference for all purposes.

BACKGROUND

1. Field

The following description relates to objective lens driving units, optical pickup devices, and optical disc drives. The objective lens driving unit and the optical pickup device incorporating the same may be capable of coping with external electrical shocks, such as, for example electro-static discharge (ESD).

2. Description of Related Art

Generally, an objective lens driving unit in an optical pickup device may comprise of a voice coil motor (VCM), which may include a static structure and a mobile structure. The static structure may include a permanent magnet, a yoke, and a wire holder. The moving structure may include a drive coil, an objective lens, and a frame for supporting the drive coil and objective lens. In general, the moving structure may be supported by a plurality of suspension wires with respect to the static structure. The wire holder may have a plurality of terminals for connecting with an external circuit and may be affixed to the yoke by a screw. The suspension wires may be an electrical connection component for applying a driving voltage used in controlling, focusing, and tracking of the objective lens to the drive coil, and may be fixed to the wire holder for electrical connection to the terminals.

An optical pickup device for a slim optical disc drive used in a notebook computer or the like may be exposed to the outside environment and may be affected by foreign materials or external electrical shock. In order to more stably drive the optical disc drive, a structure capable of coping with ESD to protect the optical pickup device from external electrical shock may be used. In a conventional structure capable of coping with ESD, terminals coupled to an external circuit may be interconnected with the wire holder by an engaging member, such as a screw, for fixing the wire holder to the yoke. Such an electrical connection structure, using an engaging member such as a screw may use a large number of components, resulting in high manufacturing cost. This structure may also induce unstable electrical connection due to poor contact. Furthermore, since the screw may occupy a predetermined area in the wire holder, the area of the screw may need to be considered when designing a pattern for the terminals.

SUMMARY

In an aspect, there is provided an objective lens driving unit including a moving structure comprising an objective lens and a plurality of drive coils; a static structure comprising magnets corresponding to the plurality of drive coils, a yoke that supports the magnets, and a wire holder that has a plurality of wiring layers including a ground wiring layer; a plurality of suspension wires that connect the plurality of drive coils to the plurality of wiring layers; a supporting portion connected to the yoke and fixed to the wire holder; a projection extending from the supporting portion and disposed adjacent to the ground wiring layer; and conductive bonding material connects the ground wiring layer with the projection.

The objective lens driving unit wherein the supporting portion may be buried in another side of the wire holder which is adjacent to a side thereof having the plurality of wiring layers.

The objective lens driving unit wherein the supporting portion may be fixed to another side of the wire holder which is adjacent to a side thereof having the plurality of wiring layers.

The objective lens driving unit may further include a circuit board fixed to the wire holder, wherein the plurality of wiring layers are disposed on the circuit board.

The objective lens driving unit wherein the projection of the supporting portion extends toward one side of the wire holder and sticks out in a direction of the wiring layers.

The objective lens driving unit wherein the projection of the supporting portion projects out toward one side of the wire holder.

The objective lens driving unit wherein the ground wiring layer is located at a center of the side of the wire holder, and the remaining wiring layers are arranged on both sides of the ground wiring layer.

The objective lens driving unit wherein the conductive bonding material is solder.

In another aspect, an optical pickup device including an objective lens driving unit; and a base that supports the objective lens driving unit, wherein the objective lens driving unit including a moving structure comprising an objective lens and a plurality of drive coils; a static structure comprising magnets corresponding to the plurality of drive coils, a yoke that supports the magnets, and a wire holder that has a plurality of wiring layers including a ground wiring layer; a plurality of suspension wires that connect the plurality of drive coils to the plurality of wiring layers; a supporting portion connected to the yoke and fixed to the wire holder; a projection extending from the supporting portion and disposed adjacent to the ground wiring layer; and conductive bonding material connects the ground wiring layer with the projection.

In yet another aspect, there is provided an optical disc drive including an optical pickup device that includes an objective lens driving unit and a base that supports the objective lens driving unit, and wherein the objective lens driving unit a moving structure comprising an objective lens and a plurality of drive coils; a static structure comprising magnets corresponding to the plurality of drive coils, a yoke that supports the magnets, and a wire holder that has a plurality of wiring layers including a ground wiring layer; a plurality of suspension wires that connect the plurality of drive coils to the plurality of wiring layers; a supporting portion connected to the yoke and fixed to the wire holder; a projection extending from the supporting portion and disposed adjacent to the ground wiring layer; and conductive bonding material connects the ground wiring layer with the projection.

Other features and aspects may be apparent from the following detailed description, the drawings, and the claims.

Figure 1:
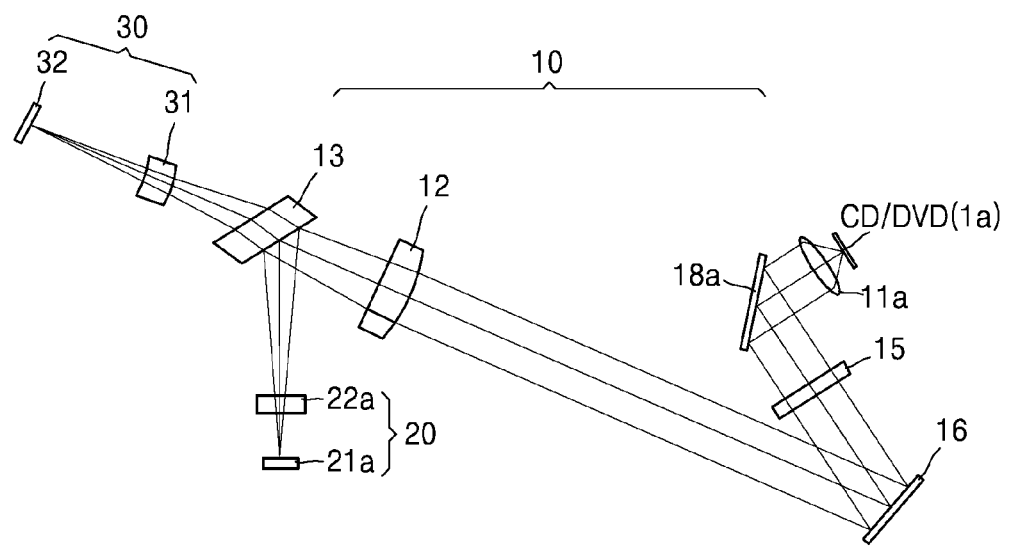
FIG. 1 is a diagram illustrating an example of an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 illustrates an example of an optical pickup device for compact disc (CD)/digital versatile disc (DVD). For example, the optical pickup device may include a light transmission system 10 directly corresponding to a first medium 1a, i.e., a CD or DVD, a light source system 20, and a light reception system 30 that generates an electrical signal for processing a data signal or a tracking error signal (TES) by using a light-receiving device 32. The light source system 20 may provide a plurality of beams for reproducing information from the first medium 1a and/or recording information to the first medium 1a. For example, the light source system 20 may provide three beams including a central main beam and a first sub-beam and a second sub-beam on either side of the central main beam.

In FIG. 1, the light source system 20 may include a light source 21a for CD/DVD and a grating element 22a. A beam from the light source 21a may pass through the grating element 22a and be incident on a first beam splitter 13. The grating element 22a may diffract the single beam from the light source 21a into a main beam and sub-beams.

In FIG. 1, the light reception system 30 may include a sensing lens 31 that focuses the main beam and the first and second sub-beams into an appropriate size for the light-receiving device 32. The light-receiving device 32 that detects the main beam and sub-beams reflected by the first medium 1a and generates an electrical signal. The light-receiving device 32 may have three light-receiving cells for receiving three beams reflected by the first medium 1a.

In FIG. 1, the light transmission system 10 may include an objective lens 11a corresponding to the first medium 1a, a path changing mirror 16, a quarter wave plate (QWP) 15, a dichroic mirror 18a disposed below the objective lens 11a, a collimating lens 12, and the first beam splitter 13. The first beam splitter 13 may reflect the three beams from the light source system 20 toward the objective lens 11a and may also transmit light reflected by the first medium 1a to the light reception system 30.

Figure 2:
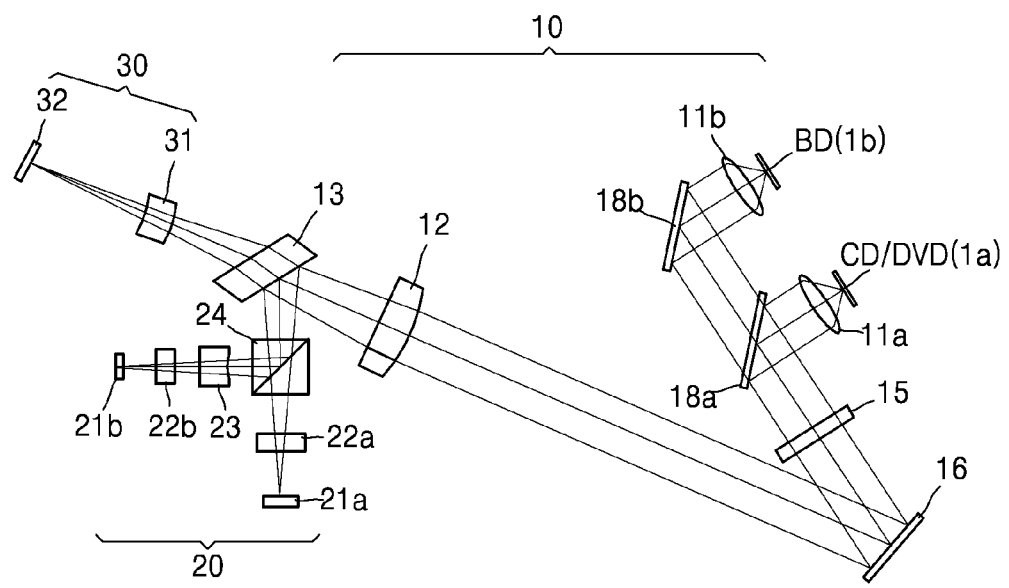
FIG. 2 is a diagram illustrating another example of an optical pickup device.

FIG. 2 illustrates an example of an optical pickup device that is compatible with CDs, DVDs, and Blu-ray discs (BDs). For example, in FIG. 2, the optical pickup device may include a light transmission system 10, a light source system 20, and a light reception system 30. The light transmission system 10 may include a total reflection mirror 18b disposed below an objective lens 11b corresponding to a BD and a dichroic mirror 18a disposed below an objective lens 11a corresponding to a CD/DVD to transmit blue light. The total reflection mirror 18b and the dichroic mirror 18a may be optional and may be disposed in an optical propagation path between the objective lenses and an optical path changing mirror 16. The optical path changing mirror 16 may reflects light from the first beam splitter 13 toward the dichroic mirror 18a and may also reflect light from the first and second media 1a and 1b, respectively, toward the first beam splitter 13.

In FIG. 2, the light source system 20 may include a plurality of light sources corresponding to the first and second media 1a and 1b. The plurality of light sources may be, for example, a light source 21a for CD/DVD, and a light source 21b for BD. Each of the light sources 21a and 21b may emit light toward a second beam splitter 24 having a cubic structure. A coupling lens 23 may be disposed between the light source 21b for BD and the second beam splitter 24 to adjust an optical distance between the light source 21b for BD and the second medium 1b by controlling an optical magnification, i.e., the amount of defocus in propagating light. Light emitted by the light sources 21a and 21b may pass through the second beam splitter 24 to the first beam splitter 13. Grating elements 22a for CD/DVD and 22b for BD, for creating a main beam and positive and negative first-order sub-beams, may be disposed between the second beam splitter 24 and the light source 21a and the light source 21b, respectively. Interval between the main beam and the positive and negative first-order sub-beams may vary according to an interval between gratings of the grating element 22a or 22b.

Figure 3:
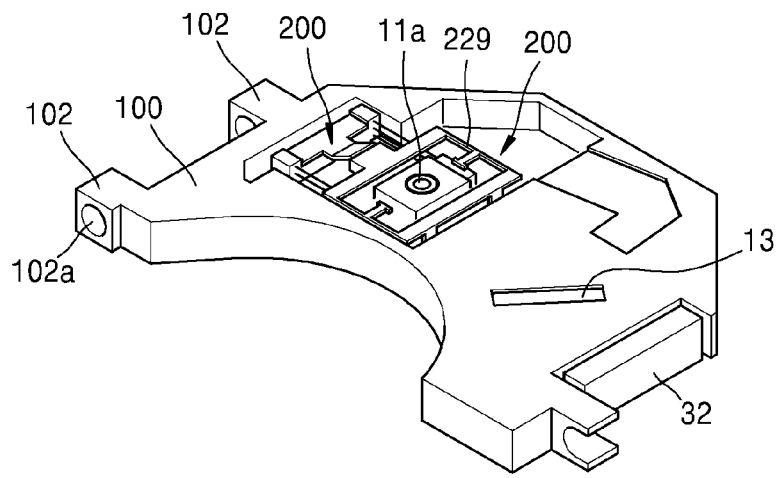
FIG. 3 is a diagram illustrating an example of an optical pickup device according to the device shown in FIG. 1.

The optical pickup device of FIG. 1 may be constructed as illustrated in FIG. 3. Referring to FIG. 3, an assembly base 100 having a predetermined thickness includes a space for accommodating a plurality of optical components. The assembly base 100 may be composed of materials such as, for example, die cast aluminum, plastic molding, or other materials suitable for assembly base of an optical pickup device. Assembly base 100 includes an objective lens driving unit 200 having an objective lens 11a and a protective cover 229 for surrounding the periphery of the objective lens 11a. Optical components such as the first beam splitter 13, the light source 21a, and the light-receiving device 32 are fixedly inserted into the assembly base 100 and arranged as shown in FIG. 1. A guide shaft portion 102 is disposed at one side of the assembly base 100 and has cylindrical holes 102a into which a guide shaft (not shown) of an optical disc drive device (not shown) is inserted.

Figure 4:
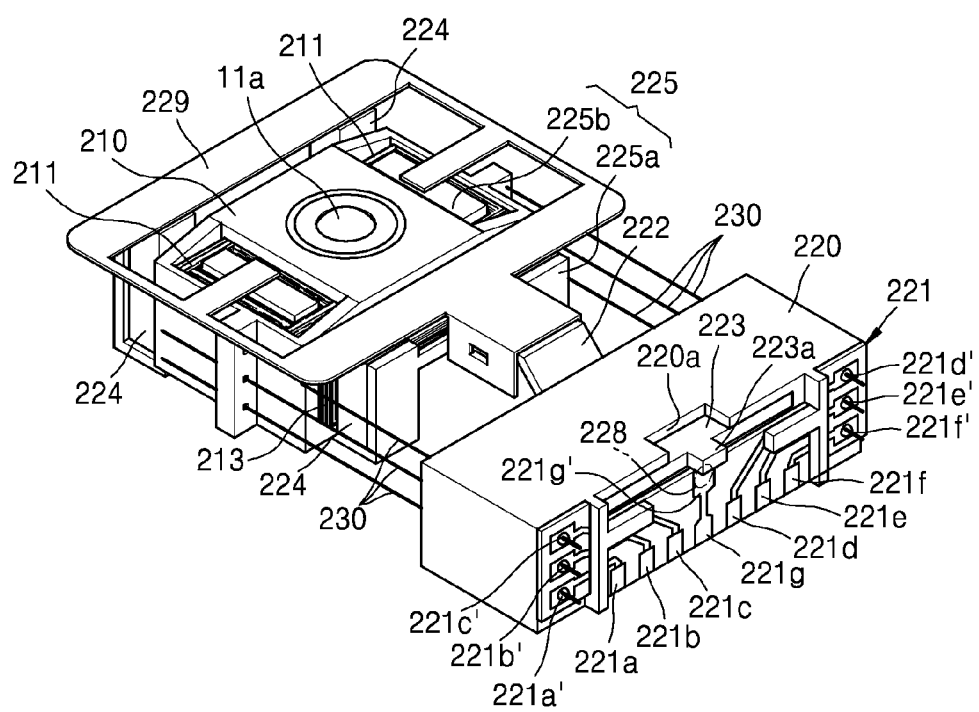
FIG. 4 is a diagram illustrating an example of an objective lens driving unit used in the optical pickup device of FIG. 3.
Figure 5:
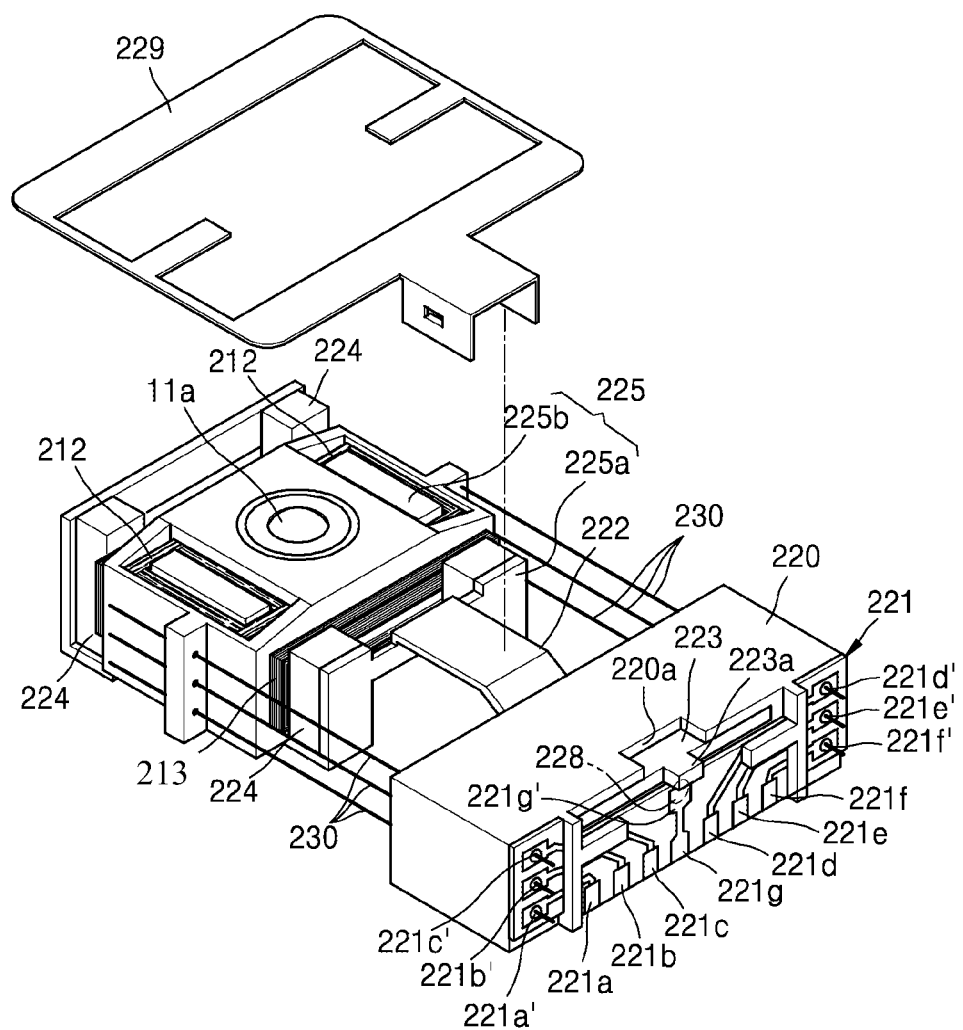
FIG. 5 is a diagram illustrating an example of objective lens driving unit of FIG. 4 with a protective cover separated from the objective lens driving unit.

FIGS. 4 and 5 illustrate an example of the objective lens driving unit 200. Referring to FIGS. 4 and 5, the objective lens 11a is disposed at a center of a top surface of a movable quadrangular frame 210, which is surrounded by the protective cover 229. As shown in FIGS. 4 and 5, quadrangular through holes 211 are formed on the frame 210 at both sides of the objective lens 11a. A first drive coil 212, for focusing of the objective lens 11a, is embedded in each through holes 211. A second drive coil 213 for tracking operation is attached to an outer surface of the through hole 211.

As shown in FIGS. 4 and 5, a static structure including, but not limited to, a permanent magnet 224, a yoke 225, and a wire holder 220 is disposed in the objective lens driving unit 200. The yoke 225 may comprise a peripheral yoke 225a facing the second drive coil 213 and a central yoke 225b disposed at a center of the through holes 211. The permanent magnet 224 is fixed to an inner surface of the peripheral yoke 225a such that the permanent magnet 224 faces the second drive coil 213. A supporting member 223 and a connection member 222 extend from a side of the yoke 225. As shown in FIGS. 4 and 5, the supporting member 223 is fixedly attached to the underside of a top surface of the wire holder 220, and the connection member 222 is disposed between the yoke 225 and the supporting member 223. One end of the protective cover 229 is coupled to the connection member 222, so that the protective cover 229 and the yoke 225 are electrically connected to each other and grounded out through a ground terminal or ground wiring layer 221g.

Figure 7:
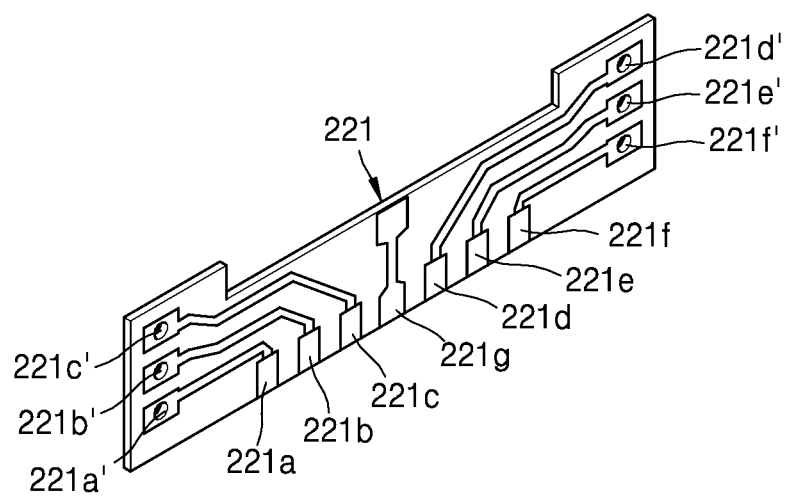
FIG. 7 is a diagram illustrating an example of a circuit board used in an objective lens driving units illustrated in FIGS. 4 and 5.
Figure 8:
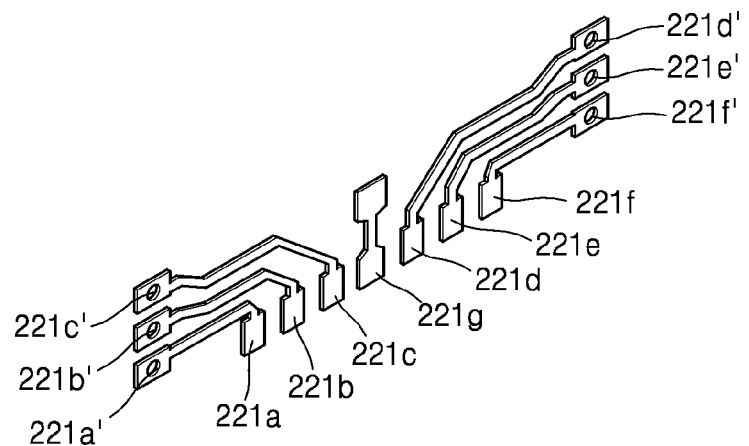
FIG. 8 is a diagram of wiring layers directly attached to a wire holder and used in the objective lens driving units illustrated in FIGS. 4 and 5.

The static structure described above elastically supports the frame 210 of the moving structure through a plurality of suspension wires 230. A plurality of control wiring layers 221a through 221f for supplying control signals to the first and second drive coils 212 and 213 and the ground wiring layer 221g for grounding the yoke 225 are provided in a side surface (or a first surface) of the wire holder 220. In the present example, the ground wiring layer 221g may be located at a center of the first surface of the wire holder 220 while the control wiring layers 221a through 221f may be arranged on both sides of the ground wiring layer 221g. Other arrangements of the wiring layers are considered to be well within the scope of the present disclosure. As shown in FIG. 7, a circuit board 221 having the plurality of wiring layers 221a through 221g may be fixedly attached to the wire holder 220. In another example, as shown in FIG. 8, the plurality of wiring layers 221a through 221g may be directly attached to the wire holder 220. The plurality of wiring layers 221a through 221g or the circuit board 221 may be attached to the wire holder 220 during manufacture of the wire holder 220 by injection molding. During injection molding, the circuit board 221 or the wiring layers 221a through 221g may be embedded in a mold as inserts. Other systems of attaching the wiring layers or the circuit board to the wire holder are considered to be well within the scope of the present disclosure.

Referring to FIGS. 4 and 5, like the circuit board 221, the supporting member 223 may be fixedly attached to the wire holder 220. This may eliminate the need for a separate engaging member such as, for examples screws, to attach the supporting member 223 to the wire holder 220. Thereby, reducing the number and cost of components. Engaging members, such as screws, are also used to connect a ground wiring layer to a yoke. But, in the embodiments shown in the drawing figures, screws are not used for ground connection. Instead, as described below, a projection 223a and the ground wiring layer 221g may be used for ground connection.

As illustrated in FIGS. 4-5, 7, and 8, the first and second ends of the suspension wires 230 pass through the wire holder 220 and are attached to terminals 221a' through 221f' arranged on left and right edges of the first surface of the wire holder 220. The terminals 221a through 221g are arranged in a line on a lower portion of the first surface of the wire holder 220 and are connected to an external circuit. In the present example, the ground wiring layer 221g is located at the center of the first surface of the wire holder 220 and may connect the protective cover 229 and yoke 225 to a ground of the external circuit.

As shown in FIG. 5, an upper terminal 221g' may be disposed adjacent to the projection 223a that extends from the supporting member 223 and is exposed through an opening 220a of the wire holder 220. As shown in FIG. 5, the upper terminal 221g' may also be connected to the projection 223a by a conductive bonding material 228 made of material such as, for example solder or epoxy compounds.

Figure 6:
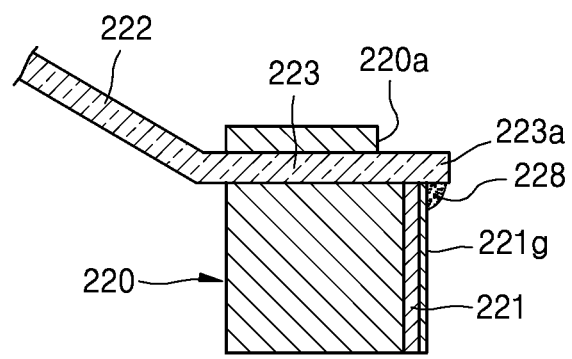
FIG. 6 is a cross-sectional view of a portion of a wire holder having a connection structure for a ground wiring layer and a projection extending from a yoke in the objective lens driving units illustrated in FIGS. 4 and 5.

FIG. 6 illustrates an example where the projection 223a and the ground wiring layer have been electrically connected to each other by the conductive bonding material 228. As shown in FIG. 6, a front edge of the projection 223a protrudes through the opening 220a and from a surface of the ground wiring layer 221g (in a transverse direction) to provide a space for receiving the conductive bonding material 228. Thus, the front edge of the projection 223a provides a space for depositing conductive bonding material 228 between a lower side of the front edge of the projection 223a and the surface of the ground wiring layer 221g. The conductive bonding material 228 enables the protective cover 229 and the yoke 225 to be connected to a ground of an external circuit. Thus, protecting circuits in an optical pickup device from external electrical shocks such as ESD.

Figure 9:
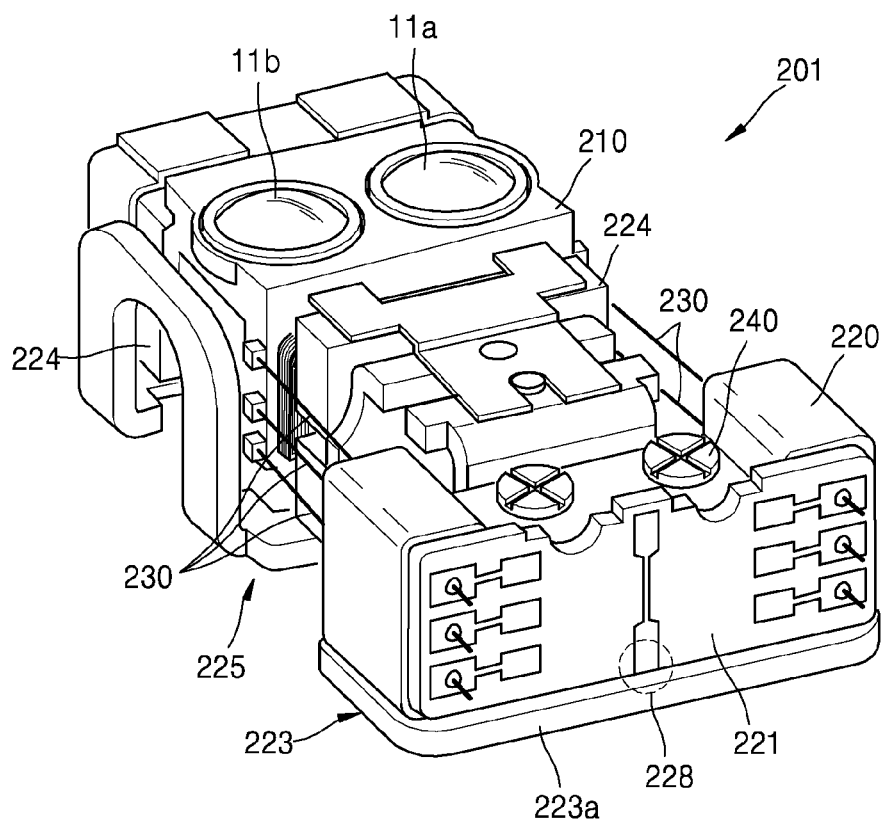
FIG. 9 is a diagram illustrating an example of an objective lens driving unit according to the device shown in FIG. 2.
Figure 10:
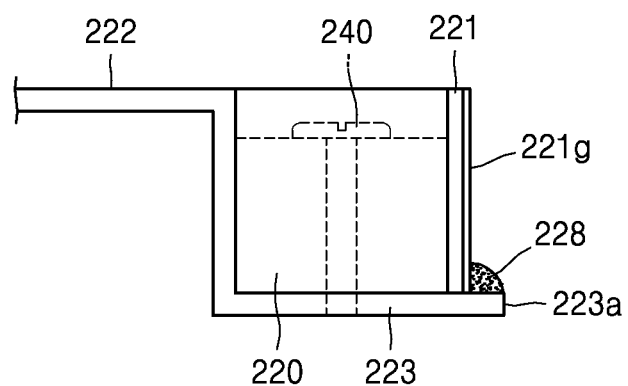
FIG. 10 is a side cross-sectional view of a portion of a wire holder having a connection structure for a ground wiring layer and a projection projecting from a supporting portion in the objective lens driving unit illustrated in FIG. 9.

FIG. 9 illustrates an example of an objective lens driving unit 201 used in the optical pickup device of FIG. 2. Referring to FIG. 9, two objective lenses 11a and 11b are disposed on a top surface of the movable quadrangular frame 210. The permanent magnet 224 is attached to the yoke 225. The connection member 222 and the supporting member 223 are disposed at one side of the yoke 225. In the example shown in FIG. 9, the supporting member 223 is disposed on below a bottom surface of the wire holder 220. The bottom surface of the wire holder 220 is removably attached to the supporting member 223 by a screw 240. As shown in FIG. 10, the projection 223a, which extends from the supporting member 223 is disposed adjacent to the ground wiring layer 221g on the circuit board 221 and is electrically connected to the ground wiring layer 221g by the conductive bonding material 228.

In an optical pickup device and an optical disc drive using the same, since wiring layers are directly coupled to the wire holder by a conductive bonding material, a stable grounded structure is achieved. Furthermore, this structure eliminates the need for engaging members such as screws, thereby reducing the manufacturing cost and allowing independent design of the fixed structure, the wire holder, the supporting portion, and the ground wiring layer. A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. An objective lens driving unit comprising:
a moving structure comprising an objective lens and a plurality of drive coils;
a static structure comprising magnets corresponding to the plurality of drive coils, a yoke that supports the magnets, and a wire holder that has a plurality of wiring layers including a ground wiring layer;

a plurality of suspension wires that connect the plurality of drive coils to the plurality of wiring layers;

a supporting portion connected to the yoke and fixed to the wire holder;

a projection extending from the supporting portion and disposed adjacent to the ground wiring layer; and conductive bonding material connecting the ground wiring layer with the projection.

2. The objective lens driving unit of claim 1, wherein the supporting portion is fixed to another side of the wire holder which is adjacent to a side thereof having the plurality of wiring layers.

3. The objective lens driving unit of claim 2, wherein the projection of the supporting portion projects out toward one side of the wire holder.

4. The objective lens driving unit of claim 1, wherein the conductive bonding material is solder.

5. An optical pickup device comprising:

an objective lens driving unit; and a base that supports the objective lens driving unit, wherein the objective lens driving unit comprises:

a moving structure comprising an objective lens and a plurality of drive coils;

a static structure comprising magnets corresponding to the plurality of drive coils, a yoke that supports the magnets, and a wire holder that has a plurality of wiring layers including a ground wiring layer;

a plurality of suspension wires that connect the plurality of drive coils to the plurality of wiring layers;

a supporting portion connected to the yoke and fixed to the wire holder;

a projection extending from the supporting portion and disposed adjacent to the ground wiring layer; and conductive bonding material connecting the ground wiring layer with the projection.

6. The optical pickup device of claim 5, wherein the supporting portion is fixed to another side of the wire holder which is adjacent to a side thereof having the plurality of wiring layers.

7. The objective lens driving unit of claim 5, wherein the conductive bonding material is solder.

8. An optical disc drive comprising:

an optical pickup device that comprises an objective lens driving unit and a base that supports the objective lens driving unit, and wherein the objective lens driving unit comprises:

a moving structure comprising an objective lens and a plurality of drive coils;

a static structure comprising magnets corresponding to the plurality of drive coils, a yoke that supports the magnets, and a wire holder that has a plurality of wiring layers including a ground wiring layer;

a plurality of suspension wires that connect the plurality of drive coils to the plurality of wiring layers;

a supporting portion connected to the yoke and fixed to the wire holder;

a projection extending from the supporting portion and disposed adjacent to the ground wiring layer; and conductive bonding material connecting the ground wiring layer with the projection.

9. The optical disc drive of claim 8, wherein the supporting portion is fixed to another side of the wire holder which is adjacent to a side thereof having the plurality of wiring layers.

10. The optical disc drive of claim 8, wherein the ground wiring layer is located at a center of the side of the wire holder, and the remaining wiring layers are arranged on both sides of the ground wiring layer.

11. The optical disc drive of claim 8, wherein the conductive bonding material is solder.

* * * * *